US005725736A

United States Patent [19]
Schroeder et al.

[11] Patent Number: 5,725,736
[45] Date of Patent: Mar. 10, 1998

[54] TISSUE CONTAINING SILICONE BETAINES

[75] Inventors: Wen Zyo Schroeder; Gary Lee Shanklin, both of Appleton, Wis.

[73] Assignee: Kimberly-Clark Worldwide, Inc., Neenah, Wis.

[21] Appl. No.: 738,201

[22] Filed: Oct. 25, 1996

[51] Int. Cl.$^6$ ..................................................... D21H 11/00
[52] U.S. Cl. .................... 162/164.4; 162/181.6; 162/184; 162/185
[58] Field of Search ........................... 162/164.4, 184, 162/185, 181.6

[56] References Cited

U.S. PATENT DOCUMENTS

| | | | |
|---|---|---|---|
| 4,609,750 | 9/1986 | Kollmeier et al. | 556/419 |
| 4,654,161 | 3/1987 | Kollmeier et al. | 252/174.15 |
| 5,514,302 | 5/1996 | Brown | 252/545 |

*Primary Examiner*—Christopher Raimund
*Attorney, Agent, or Firm*—Gregory E. Croft

[57] ABSTRACT

The invention relates to tissue products having improved softness properties and methods of making them. Specifically, improved softness is achieved by incorporating a silicone betaine either into the furnish and/or topically applied to the tissue web. Optionally, one or more softeners/debonders are also incorporated into the fiber furnish at the wet end of the tissue machine prior to formation, and/or by an optional topical treatment after the tissue web is formed or dried. The result is a tissue product with added bulk and a smooth surface feel, both properties contributing to improved softness characteristics.

14 Claims, No Drawings

TISSUE CONTAINING SILICONE BETAINES

BACKGROUND OF THE INVENTION

Improving the softness of tissues is a continuing objective in tissue manufacture. In general, prior efforts have been directed at reducing the inter-fiber bonding within the tissue structure or coating the tissue surface with chemicals which improve the surface feel. Softness, however, is a perceived property of tissues comprising many factors including bulk softness and surface smoothness. To date, efforts have tended to focus on one or the other. Hence, there is a need for a method which improves both bulk softness and surface softness.

SUMMARY OF THE INVENTION

It has now been discovered that the softness of tissues can be improved by the addition of a silicone betaine (hereinafter defined) either to the tissue making furnish at the wet-end of the tissue machine and/or to the formed web by topical addition. Optionally, one or more softener/debonders (hereinafter defined) can be added to the tissue making furnish and/or to the surface of the tissue web.

Hence, in one aspect, the invention resides in a method for making soft tissue comprising: (a) forming an aqueous suspension of papermaking fibers containing a silicone betaine, with or without one or more softener/debonders; (b) forming a tissue web by depositing the aqueous suspension of papermaking fibers onto a forming fabric; and (c) dewatering and drying the web.

In another aspect, the invention resides in a method for making soft tissue comprising (a) forming an aqueous suspension of papermaking fibers; (b) forming a tissue web by depositing the aqueous suspension of papermaking fibers onto a forming fabric; (c) dewatering and drying the web; and (d) topically applying a silicone betaine to the web.

In another aspect, the invention resides in a method for making soft tissue comprising (a) forming an aqueous suspension of papermaking fibers and a silicone betaine; (b) forming a tissue web by depositing the aqueous suspension of papermaking fibers onto a forming fabric; (c) dewatering and drying the web; and (d) topically applying a silicone betaine to the web.

In all of the foregoing aspects, the amount of the silicone betaine in the aqueous suspension or added to the web can be from about 0.01 to about 10 weight percent, lo based on fiber, more specifically from about 0.1 to about 3 weight percent. In addition, one or more softener/debonders can be optionally added, either by inclusion in the aqueous suspension of papermaking fibers or by topical addition to the web. The softener/debonder applied to the web can be the same softener/debonder added to the furnish, or it can be different if a softener/debonder is introduced at both locations. In a further aspect, the invention resides in a soft tissue containing from about 0.01 to about 10 weight percent, based on dry fiber, more specifically from about 0.1 to about 3 weight percent of a silicone betaine. Optionally, the tissue can further contain from about 0.1 to about 3 weight percent, based on dry fiber, of one or more softener/debonders described below.

As used herein, a silicone betaine is a compound having the following structural formula:

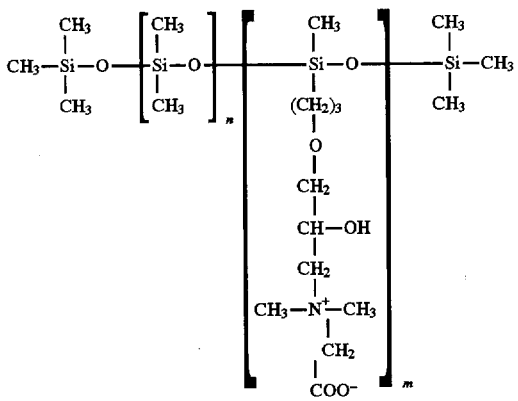

wherein
m=1–100; and
n=1–1000.

As used herein, a "softener/debonder" is a chemical compound selected from the group consisting of quaternary ammonium compounds, bis-imidazolinium compounds, di-quaternary ammonium compounds, polyammonium compounds, cationic amidoamines, phospholipids, silicone quaternaries, organoreactive polysiloxanes, and silicone glycols.

Suitable quaternary ammonium compounds have the following structures:

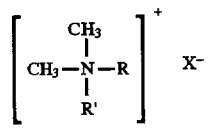

wherein
X=chloride, methyl sulfate, or other compatible counterion; and
R', R can be the same or different, aliphatic, saturated or unsaturated $C_8$–$C_{24}$;

or

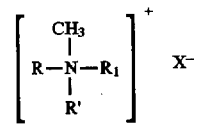

wherein
X=chloride, methyl sulfate, or other compatible counterion;
R', R can be the same or different, are aliphatic, saturated or unsaturated $C_8$–$C_{24}$; and
$R_1$=benzyl or epoxy group;

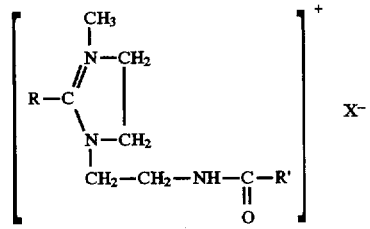

wherein
X=chloride, methyl sulfate, or other compatible counterion; and

R, R'=can be the same or different, are aliphatic, saturated or unsaturated $C_8$–$C_{24}$;

or

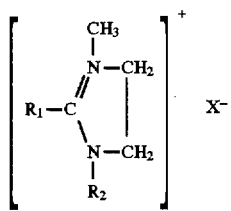

wherein

X=chloride, methyl sulfate or other compatible counterion;

$R_1$=aliphatic, saturated or unsaturated, branched or normal, $C_8$–$C_{24}$;

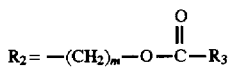

m=1–6; and $R_3$=aliphatic, saturated or unsaturated, branched or normal, $C_8$–$C_{24}$;

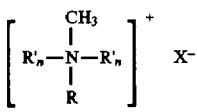

wherein

R=aliphatic, normal or branched, saturated or unsaturated, $C_8$–$C_{24}$;

X=chloride, methyl sulfate, ethyl sulfate, or other compatible counterion;

R'=2-hydroxyethyl or polyethoxyethanol; and n=1 to 50;

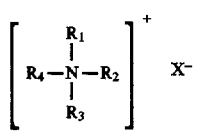

wherein $R_1$, $R_2$, $R_3$ are $C_1$–$C_6$ alkyl or hydroxyalkyl, can be the same or different;

X=chloride, methyl sulfate, ethyl sulfate or other compatible counterion;

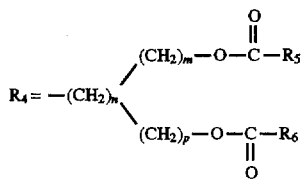

n=2–6;

m=0–6;

p=1–6; and $R_5$, $R_6$ are $C_8$–$C_{24}$ aliphatic, normal or branched, saturated or unsaturated, (same or different);

or

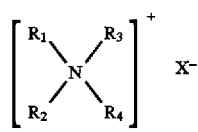

wherein

X=chloride, methyl sulfate, ethyl sulfate or other compatible counterion;

$R_1$, $R_2$ can be the same or different, are $C_1$–$C_6$ alkyl or hydroxyalkyl;

$R_3$, $R_4$ can be the same or different, are selected from the group:

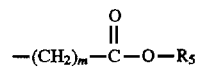

where m=1–6; and $R_5$=aliphatic, $C_8$–$C_{24}$, saturated or unsaturated, normal or branched;

or

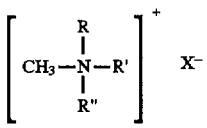

wherein

R, R', R" can be the same or different, are aliphatic alkyl, normal or branched, saturated or unsaturated, $C_8$–$C_{24}$; and X=chloride, methyl sulfate or other compatible counterion or

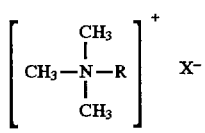

wherein

R=aliphatic, saturated or unsaturated, $C_8$–$C_{24}$; or allyl-; or R'—O—$(CH_2)_m$—where R'=normal or branched, $C_4$–$C_{18}$; m=1–4; and X=chloride, sulfate or any other compatible counterion;

or

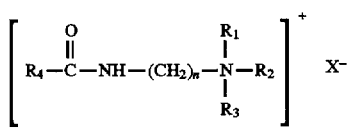

wherein $R_1$=hydrogen or $C_1$–$C_4$ alkyl;

$R_2$, $R_3$ can be the same or different, are $C_1$–$C_6$ alkyl, hydroxyalkyl, or

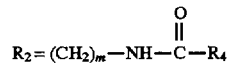

where m=2–6;

$R_4$=aliphatic $C_{12}$–$C_{24}$, saturated or unsaturated;

n=2–6; and

X=halide, methyl sulfate, ethyl sulfate or other compatible counterion.

Suitable quaternized protein compounds include the following structures:

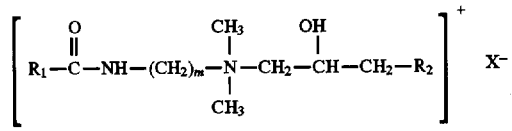

wherein
m=1–6;
$R_1$=fatty acid radical, saturated or unsaturated, $C_{12}$–$C_{24}$;
$R_2$=hydrolyzed soy protein, hydrolyzed silk protein, collagen, keratin moiety or hydrolyzed wheat protein; and
X=chloride, lactate or other compatible counterion;

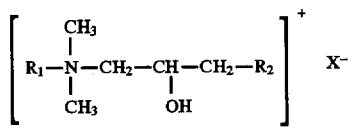

wherein
$R_1$=fatty acid radical, saturated or unsaturated, $C_{12}$–$C_{24}$;
$R_2$=hydrolyzed collagen or keratin moiety; and
X=chloride, lactate or other compatible counterion.

Suitable phospholipids include, without limitation, those having the following structures:

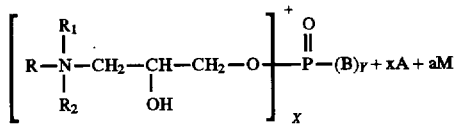

wherein
x=1 to 3;
x+y=3;
a=0 to 2;
B=O⁻ or OM;
A=an anion;
M=a cation; and
R, $R_1$ & $R_2$ can be the same or different, are alkyl, substituted alkyl, alkyl aryl or alkenyl groups of up to 16 carbon atoms and the total carbon atoms of R+$R_1$+$R_2$=10 to 24;
or

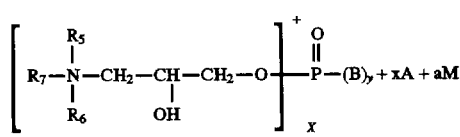

wherein
x=1 to 3;
x+y=3;
a=0 to 2;
B=O⁻ or OM;
A=an anion;
M=a cation;
$R_5$, $R_6$ may be the same or different, are alkyl, hydroxyalkyl, carboxyalkyl of up to $C_6$, or polyoxyalkylene of up to $C_{10}$, or
$R_5$, $R_6$ and the nitrogen they are attached to may represent an N-heterocycle;

and $R_7$=an amidoamine moiety of the formula:

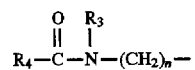

where
n=2 to 6;
$R_3$=hydrogen or alkyl, hydroxyalkyl or alkenyl of up to 6 carbons, or cycloalkyl of up to 6 carbon atoms, or polyoxyalkylene of up to carbon atoms; and
$R_4$=alkyl, alkenyl, alkoxy or hydroxyalkyl, $C_5$–$C_{21}$, or aryl or alkaryl of up to $C_{20}$.
or

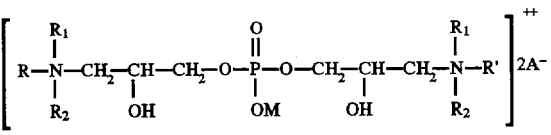

wherein
A=an anion;
M=a cation;
R, $R_1$ & $R_2$ can be the same or different, are alkyl, substituted alkyl, alkyl awl or alkenyl groups of up to 16 carbon atoms, and the total carbon atoms of R+$R_1$+$R_2$=10 to 24; and
R' is an amidoamine moiety of the structure:

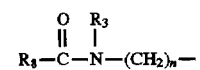

where
n=2 to 6;
$R_3$=hydrogen or alkyl, hydroxyalkyl or alkenyl of up to 6 carbons; or cycloalkyl of up to 6 carbon atoms, or polyoxyalkylene of up to 10 carbon atoms; and
$R_8$ has the following structure:

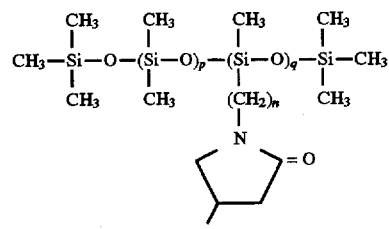

where
n=3 or greater;
p=1 to 1000;
q=1 to 25.

Suitable silicone quaternaries include the following structures:

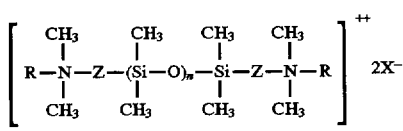

wherein
R=alkyl group, $C_{12}$–$C_{24}$;
Z=—$CH_2$—$CH_2$—$CH_2$—O—$(CH_2)_3$—;
X=alkoxy, chloride or other compatible counterion; and
n=1 to 50;

or $$CH_3-Si(CH_3)_2-[O-Si(CH_3)(R_1)]_x-[O-Si(CH_3)(R_2)]_y-[O-Si(CH_3)((CH_2)_a-(OC_2H_4)_b-(OCHCH_3CH_2)_c-(OC_2H_4)_d-OCH_2CHOHCH_2-R)]_z-O-Si(CH_3)_3 \quad zY^-$$

wherein:

$x = 0-1000$;

$x, y, z = 1-1000$;

$R_1$, $R_2$ can be the same or different, are alkyl or hydroxyalkyl, $C_1-C_{20}$ or phenyl;

$a = 1-4$;

$b, c, d = 0-20$;

Y=halide, methyl sulfate, ethyl sulfate or other compatible counterion; and

R can be selected from among the following four numbered groups:

(1)

$$R_3-\overset{+}{\underset{R_4}{N}}-R_5$$

where $R_3$, $R_4$, $R_5$ can be the same or different, are selected from hydroxyalkyl or alkyl group, $C_1-C_4$; or aliphatic group, $C_8-C_{24}$, normal or branched, saturated or unsaturated;

(2)

$$R_6-\overset{+}{\underset{R_7}{N}}-(CH_2)_n-\overset{H}{\underset{}{N}}-\overset{O}{\underset{}{C}}-R_8$$

where $R_6$, $R_7$, $R_8$ can be the same or different, are selected from aliphatic group, $C_8-C_{24}$, normal or branched, saturated or unsaturated; and $n = 1-6$;

or where $R_6$, $R_7$ can be the same or different, are alkyl or hydroxyalkyl, $C_1-C_6$;

$R_8$=aliphatic, $C_8-C_{24}$, normal or branched, saturated or unsaturated; and $n = 1-6$;

or where $R_6$=hydroxyalkyl or alkyl, $C_1-C_6$;

$n = 1-6$;

$$R_7 = -(CH_2)_m-\underset{H}{N}-\underset{O}{\overset{}{C}}-R_9$$

$m = 1-6$; and $R_9$, $R_8$=aliphatic, $C_8-C_{24}$, normal or branched, saturated or unsaturated;

or where $R_6$=hydroxyalkyl or alkyl, $C_1-C_6$ $$R_7 = -(CH_2)_{m'}-\overset{O}{\overset{\|}{C}}-O-R_9$$

$m' = 1-6$; and $R_8$, $R_9$ can be the same or different, are aliphatic, $C_8-C_{24}$, normal or branched, saturated or unsaturated;

(3)

$$R_{10}-C\overset{\overset{|}{N^+}}{\underset{\underset{R_{11}}{N}}{\diagdown}}\overset{C}{\underset{C}{|}}$$

where $R_{10}$, $R_{11}$ can be the same or different, are aliphatic $C_8-C_{24}$, normal or branched, saturated or unsaturated, or $$R_{11} = -(CH_2)_o-O-\overset{O}{\overset{\|}{C}}-R_{12}$$

where $o = 1-6$; and $R_{12}$=aliphatic, $C_8-C_{24}$, normal or branched, saturated or unsaturated;

(4)

$$R_{12}-\overset{+}{\underset{R_{13}}{N}}-R_{14}$$

where $R_{12}$, $R_{13}$=$C_1-C_6$, alkyl or hydroxyalkyl;

$R_{14}$=$-(CH_2)_p-C-O-R_{15}$;

$p = 1-6$; and $R_{15}$=aliphatic, $C_8-C_{24}$, normal or branched, saturated or unsaturated;

or $R_{12}$=$C_1-C_6$ alkyl or hydroxyalkyl;

$R_{13}$, $R_{14}$ can be the same or different, are $$-(CH_2)_p-\overset{O}{\overset{\|}{C}}-O-R_{15}$$

$p = 1-6$;

$R_{15}$=aliphatic, $C_8-C_{24}$, normal or branched, saturated or unsaturated;

or $R_{12}$, $R_{13}$ can be the same or different, are $C_1-C_6$ alkyl or hydroxyalkyl;

$$R_{14} = -(CH_2)_q \begin{matrix} (CH_2)_r-O-\overset{O}{\underset{\|}{C}}-R_{16} \\ \\ (CH_2)_s-O-\underset{\|}{\overset{\|}{C}}-R_{17} \\ O \end{matrix}$$

q=1–6;

r, s=0–6; and $R_{16}$, $R_{17}$ can be the same or different, are $C_8$–$C_{24}$ aliphatic, normal or branched, saturated or unsaturated.

Suitable organoreactive polysiloxanes include the following structures:

$$CH_3-Si(CH_3)_2-O-(Si(CH_3)_2-O)_x-(Si(CH_3)(CH_2CHCH_3CH_2R)-O)_y-Si(CH_3)_3$$

and $$R-(CH_2)_n-Si(CH_3)_2-O-(Si(CH_3)_2-O)_x-Si(CH_3)_2-(CH_2)_n-R$$

and $$R-(CH_2)_n-Si(CH_3)_2-O-(Si(CH_3)_2-O)_x-Si(CH_3)_3$$

wherein

R=amine, carboxy, hydroxy, or epoxy;

n=3 or greater;

x=1 to 1000; and y=1 to 25.

Suitable silicone glycols include the following structure:

$$CH_3-Si(CH_3)_2-O-(Si(CH_3)_2-O)_x-(Si(CH_3)(R)-O)_y-Si(CH_3)_3$$

with side chain: $O-(CH_2-CH_2-O)_m-(CH_2-CH_2-O)_n-R_1$ / $CH_3$ wherein

R=alkyl group, $C_1$–$C_6$;

$R_1$=acetate or hydroxy group;

x=1 to 1000;

y=1 to 50;

m=1 to 30; and n=1 to 30.

Suitable bis-imidazolinium compounds include the following structure:

$$\left[ \begin{matrix} CH_3 & & CH_3 \\ N-CH_2 & & H_2C-N \\ \| & | & | & \| \\ C & CH_2 & H_2C & C \\ R_1 & N-(CH_2)_n-N & R_2 \end{matrix} \right]^{++} 2X^-$$

wherein

X=halide, methylsulfate, ethylsulfate or other compatible counterions;

n=2–8; and $R_1$, $R_2$ may be the same or different, are aliphatic, $C_{12}$–$C_{24}$, normal or branched, saturated or unsaturated.

Suitable cationic amidoamines include the following structures:

$$\left[ R-\overset{O}{\underset{\|}{C}}-NH-(CH_2)_n-N\overset{H}{\underset{}{}}\begin{matrix}(CH_2)_2\\ \\ (CH_2)_2\end{matrix}O \right]^+ X^-$$

wherein

R=aliphatic $C_{12}$–$C_{24}$, saturated or unsaturated;

n=2–6; and

X=halide, methyl sulfate, ethyl sulfate or other compatible counterion.

Suitable diquaternary ammonium compounds include the following structures:

$$\left[ \begin{matrix} R_1 & & R_4 \\ | & & | \\ R_2-N-(CH_2)_n-N-R_5 \\ | & & | \\ R_3 & & R_6 \end{matrix} \right]^{++} 2X^-$$

wherein

X=halide, methylsulfate, ethylsulfate or other compatible counterion;

n=2–8;

$R_1$, $R_4$ may be the same or different, are H, $CH_3$, or $(CH_2)_m OH$ where m=1–4;

$R_2$, $R_3$, $R_5$, $R_6$ may be the same or different, are from the following groups:

$(CH_2)_p$ OH, where p=1–6;

or $$(C_2H_4O)_q-\overset{O}{\underset{\|}{C}}-R,$$

where q=1–10, R=aliphatic, $C_{12}$–$C_{24}$, saturated or unsaturated, normal or branched;

or $$(CH_2)_r-\overset{H}{\underset{}{N}}-\overset{O}{\underset{\|}{C}}-R',$$

where r=1–10, R'=aliphatic, $C_{12}$–$C_{24}$, saturated or unsaturated, normal or branched;

or $$(CH_2)_s-\overset{OH}{\underset{}{CH}}-(CH_2)_t-O-R'',$$

where s=1–10, t=1–4, R''=aliphatic, $C_{12}$–$C_{24}$, saturated or unsaturated, normal or branched.

Suitable poly ammonium compounds include the following structures:

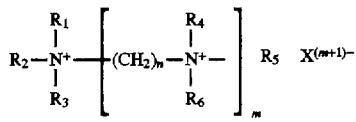

wherein n=2–6;

m>1;

$R_1$, $R_4$, $R_3$, $R_6$ may be the same or different, are H, $CH_3$, $(CH_2)_p$ OH where p=2–6, or aliphatic $C_{12}$–$C_{24}$, normal or branched, saturated or unsaturated;

$R_2$, $R_5$ may be the same or different, are aliphatic, $C_{12}$–$C_{24}$, normal or branched, saturated or unsaturated; or $(CH_2)_q$—CHOH—R' where R'=$C_{12}$–$C_{24}$, normal or branched, saturated or unsaturated and q=1–6; or $(CH_2)_r$—O—R" where r=1–6, R"=$C_{12}$–$C_{24}$, normal or branched, saturated or unsaturated.

When a combination of silicone betaine and a softener/debonder is desired, the combination can be added to the thick stock simultaneously or separately. The combinations can contain one or more compounds from the above groups and added to the slurry, either in a premixed form or individually metered.

The final tissue sheet comprises from about 0.01 to about 10 percent (by weight of the fiber) of the silicone betaine added to the wet end of the tissue making process, individually or in combination. More preferably, the final tissue sheet comprises from about 0.1 to about 3 percent of the silicone betaine added at the wet end, based on the weight of the fiber.

Silicone betaines and softener/debonders used for the topical treatment can be delivered in an aqueous solution or be dissolved in a suitable solvent such as propylene glycol, hexylene glycol, ethylene glycol, polyethylene glycol, isopropyl alcohol, methanol, ethanol or other organic solvents. They can be applied to the surface of the basesheet individually or in combination with others. It is preferred that the composition for topical treatment comprises from about 1 to about 100 weight percent of the silicone betaine and/or softener/debonder (individually or in combination), more preferably from about 35 to about 80 weight percent. It is also preferred that the silicone betaine and/or the softener/debonder be topically added to the tissue sheet at an add-on ratio of from about 0.01 to about 10 weight percent of the fiber, and more preferably from about 0.1 to about 3 weight percent of the fiber.

Suitable methods for the topical treatment include, but are not limited to spraying, rotogravure printing, trailing blade coating, flexographic printing, and the like.

EXAMPLES

Example 1

A 1-ply, blended, uncreped, through-air-dried basesheet was made. The furnish contained 50 weight percent of bleached eucalptus hardwood kraft pulp and 50 weight percent of bleached northern softwood kraft pulp. The thick stock was diluted to approximately 1% consistency prior to forming, dewatering and drying of the tissue web. Tegopren 6950 (copolymer of polymethyl siloxane and betaine, Goldschmidt Chemical Corp.) was added to the thick stock of a tissue making furnish. The add-on amount was 2 kilograms of Tegopren 6950 per metric ton of fiber (0.2 weight percent). The fan pump was set at about 21 psi, while wet draw was set at about −25%. The total basis weight of the sheet was 16 lb per 2880 square feet with a target MD stretch of 20%. The resulting tissue product was softer than the untreated control with improved surface smoothness.

Example 2

A 2-ply, wet pressed, creped tissue was made using a layered headbox. The first stock layer (the layer which ultimately contacts the Yankee dryer surface) contained eucalyptus hardwood fiber and provided about 60 dry weight percent of the tissue sheet. The remaining 40 percent of the tissue sheet was provided via a second stock layer consisting of northern softwood kraft pulp. The total basis weight of the sheet was about 7.3 pounds per 2880 square feet of air dried tissue. Two strength agents were added to the fiber stock layers prior to the headbox. Parez 631NC (a glyoxalated polyacrylamide from Cytec Industries, Inc.) was metered into the softwood thick stock at 0.08 to 0.1 percent of the total fiber weight. Another strength agent, Kymene 557 LX (commercially available from Hercules, Inc.) was metered into both the hardwood and the softwood thick stock at 0.05 and 0.1 percent of the total fiber weight, respectively.

After drying and creping, the tissue sheet was plied together with a like sheet to form a two-ply, crimped tissue. Tegopren 6950 (copolymer of polymethyl siloxane and betaine, Goldschmidt Chemical Corp. 30% active) was rotogravure-printed onto both plies of the hardwood layer at an add-on amount of approximately 1 percent per ply based on the weight of fiber. The resulting tissue product had improved surface smoothness.

It will be appreciated that the foregoing examples, given for purposes of illustration, are not to be construed as limiting the scope of this invention, which is defined by the following claims and all equivalents thereto.

We claim:

1. A soft tissue comprising from about 0.01 to about 10 weight percent, based on fiber, of a silicone betaine compound having the following structure:

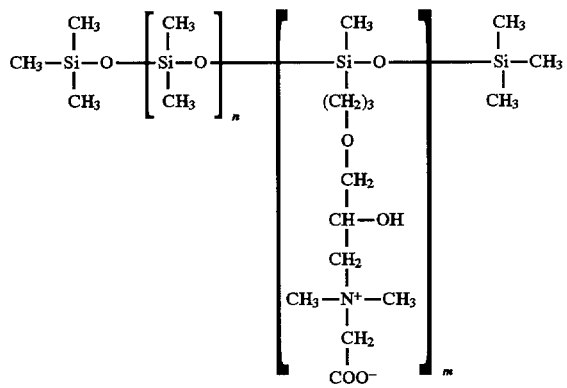

wherein m=1–100; and n=1–1000.

2. The tissue of claim 1 wherein the amount of the silicone betaine is from about 0.1 to about 10 weight percent.

3. The tissue of claim 1 wherein the amount of the silicone betaine is from about 0.1 to about 3 weight percent.

4. The tissue of claim 1 further comprising a softener/debonder selected from the group consisting of quaternary ammonium compounds, bis-imidazolinium compounds, di-quaternary ammonium compounds, polyammonium compounds, phospholipids, silicone quaternaries, organoreactive polysiloxanes and silicone glycols.

5. The tissue of claim 4 wherein the amount of the softener/debonder is from about 0.01 to about 10 weight percent, based on fiber.

6. A method for making a soft tissue comprising:
(a) forming an aqueous suspension of papermaking fibers and from about 0.01 to about 10 weight percent, based on fiber, of a silicone betaine compound having the following structure:

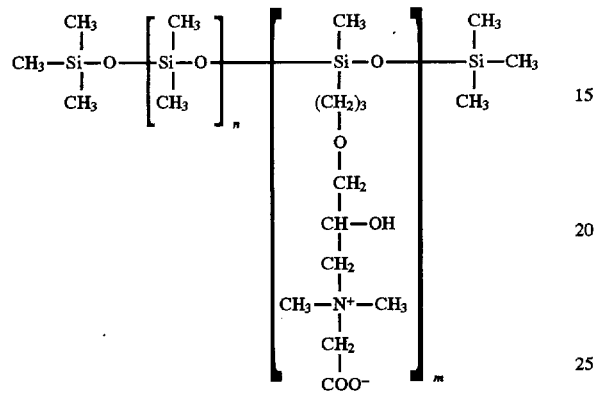

wherein
m=1–100; and
n=1–1000;
(b) forming a tissue web by depositing the aqueous suspension of papermaking fibers onto a forming fabric; and
(c) dewatering and drying the tissue web.

7. The method of claim 6 comprising topically applying to the tissue web from about 0.01 to about 10 weight percent, based on fiber, of a silicone quaternary compound.

8. The method of claim 6 or 7 wherein from about 0.01 to about 10 weight percent, based on fiber, of a softener/debonder is included in the aqueous suspension of papermaking fiber.

9. The method of claim 6 or 7 wherein from about 0.01 to about 10 weight percent, based on fiber, of a softener/debonder is topically applied to the tissue web.

10. The method of claim 6 wherein the amount of the silicone betaine compound is from about 0.1 to about 3 weight percent.

11. A method for making a soft tissue comprising:

(a) forming an aqueous suspension of papermaking fibers;

(b) forming a tissue web by depositing the aqueous suspension of papermaking fibers onto a forming fabric;

(c) dewatering and drying the tissue web; and (d) topically applying to the tissue web from about 0.01 to about 10 weight percent, based on fiber, of a silicone betaine compound of the following structure:

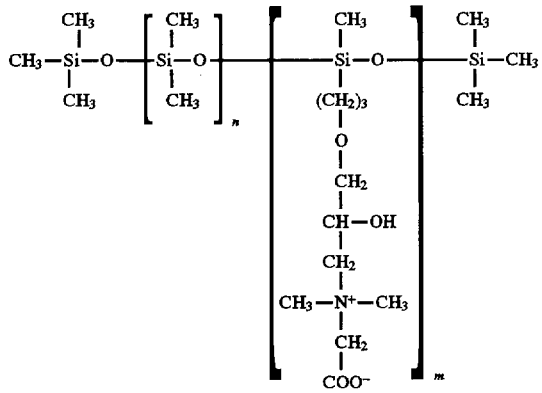

wherein m=1–100; and n=1–1000.

12. The method of claim 11 further comprising topically applying from about 0.01 to about 10 weight percent, based on fiber, of a softener/debonder to the tissue web.

13. The method of claim 11 further comprising including from about 0.01 to about 10 weight percent, based on fiber, of a softener/debonder in the aqueous suspension of papermaking fibers.

14. The method of claim 11 wherein the amount of the silicone betaine is from about 0.1 to about 3 weight percent.

* * * * *